US010856480B2

(12) United States Patent
Moffitt et al.

(10) Patent No.: US 10,856,480 B2
(45) Date of Patent: Dec. 8, 2020

(54) CULTIVATION SYSTEM AND METHODS

(71) Applicant: Stem Cultivation, Inc., Woburn, MA (US)

(72) Inventors: Kyle W. Moffitt, Woburn, MA (US); Christopher R. Denaro, Cambridge, MA (US); Robert A. Gibson, Woburn, MA (US); John M. Sullivan, Hubbardston, MA (US); Leszek Ziolek, Nashua, NH (US)

(73) Assignee: STEM CULTIVATION, INC., Woburn, MA (US)

( * ) Notice: Subject to any disclaimer, the term of this patent is extended or adjusted under 35 U.S.C. 154(b) by 298 days.

(21) Appl. No.: 15/707,545

(22) Filed: Sep. 18, 2017

(65) Prior Publication Data

US 2019/0082627 A1 Mar. 21, 2019

(51) Int. Cl.
A01G 31/02 (2006.01)
A01G 31/06 (2006.01)
B65D 88/12 (2006.01)
B65D 90/00 (2006.01)
B65D 88/02 (2006.01)
B65D 90/48 (2006.01)
B65D 88/74 (2006.01)
A01G 9/02 (2018.01)
A01G 7/02 (2006.01)
(Continued)

(52) U.S. Cl.
CPC ............ A01G 31/06 (2013.01); A01G 9/025 (2013.01); B65D 88/022 (2013.01); B65D 88/121 (2013.01); B65D 88/74 (2013.01); B65D 90/006 (2013.01); B65D 90/0053 (2013.01); B65D 90/48 (2013.01); A01G 7/02 (2013.01); A01G 7/045 (2013.01); A01G 2031/006 (2013.01)

(58) Field of Classification Search
CPC ...... A01G 9/025; A01G 31/045; A01G 31/06; A01G 2031/006
USPC ....................... 47/60, 62 R, 63, 65
See application file for complete search history.

(56) References Cited

U.S. PATENT DOCUMENTS 4,628,631 A * 12/1986 Van Wingerden ..... A01G 9/143
47/65
8,250,809 B2 * 8/2012 Simmons ............... A01G 31/02
47/62 N
(Continued)

Primary Examiner — Peter M Poon
Assistant Examiner — Danielle A Clerkley
(74) Attorney, Agent, or Firm — Seyfarth Shaw LLP; George Haight

(57) ABSTRACT

A system and method for cultivating plants is described. The system may include a tower structure having a vertical series of vessels for holding a netted pot or other container. The system may have a pressurized irrigation system that is in fluid communication with each vessel. The system may further include lamps to provide an adequate light source. The system may also include sensors, monitors and controls to establish and maintain environmental conditions suitable for proper plant growth. The system may further be implemented as a scalable system in which multiple tower structures may be installed into a scaffold system. Sets of towers may be slidably affixed to a scaffold such that the towers may be slid along a track thereby creating easy access to the plants, vessels, lights and the irrigation system. The system may be expanded to include multiple scaffolds affixed to a skeletal frame or compartment interior.

12 Claims, 10 Drawing Sheets

(51) Int. Cl.
 *A01G 31/00* (2018.01)
 *A01G 7/04* (2006.01)

(56) References Cited

U.S. PATENT DOCUMENTS

| | | | |
|---|---|---|---|
| 10,034,435 B2* | 7/2018 | Helene | A01G 9/14 |
| 10,499,575 B2* | 12/2019 | Stoltzfus | A01G 31/06 |
| 2006/0162252 A1* | 7/2006 | Lim | A01G 31/045 |
| | | | 47/59 R |
| 2012/0137578 A1* | 6/2012 | Bradford | A01G 9/143 |
| | | | 47/65 |
| 2016/0143234 A1* | 5/2016 | Nasu | A01G 9/024 |
| | | | 47/62 N |
| 2017/0055473 A1* | 3/2017 | Baker | A01G 9/025 |
| 2017/0142912 A1* | 5/2017 | Gasmer | A01G 9/0297 |

* cited by examiner

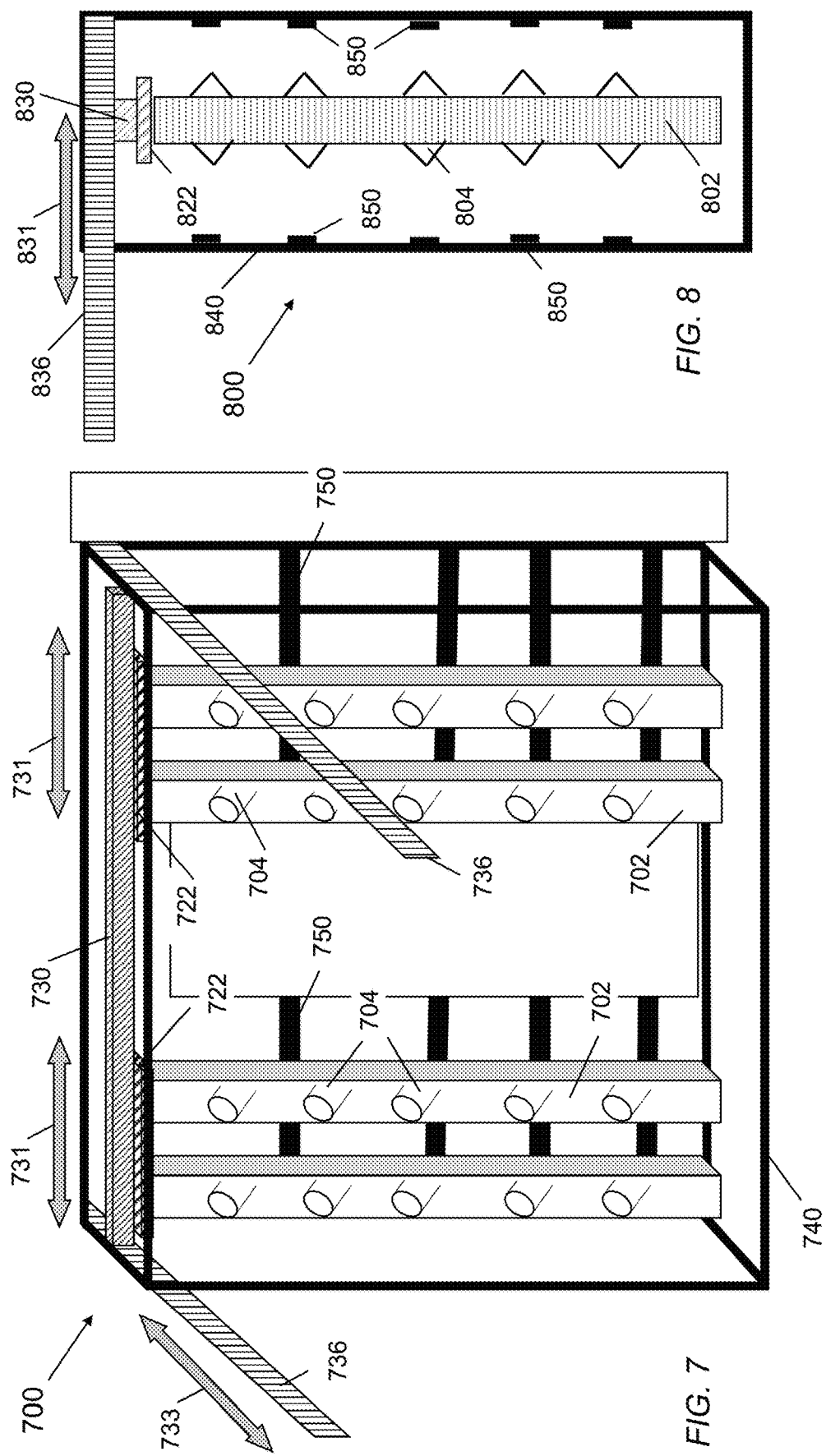

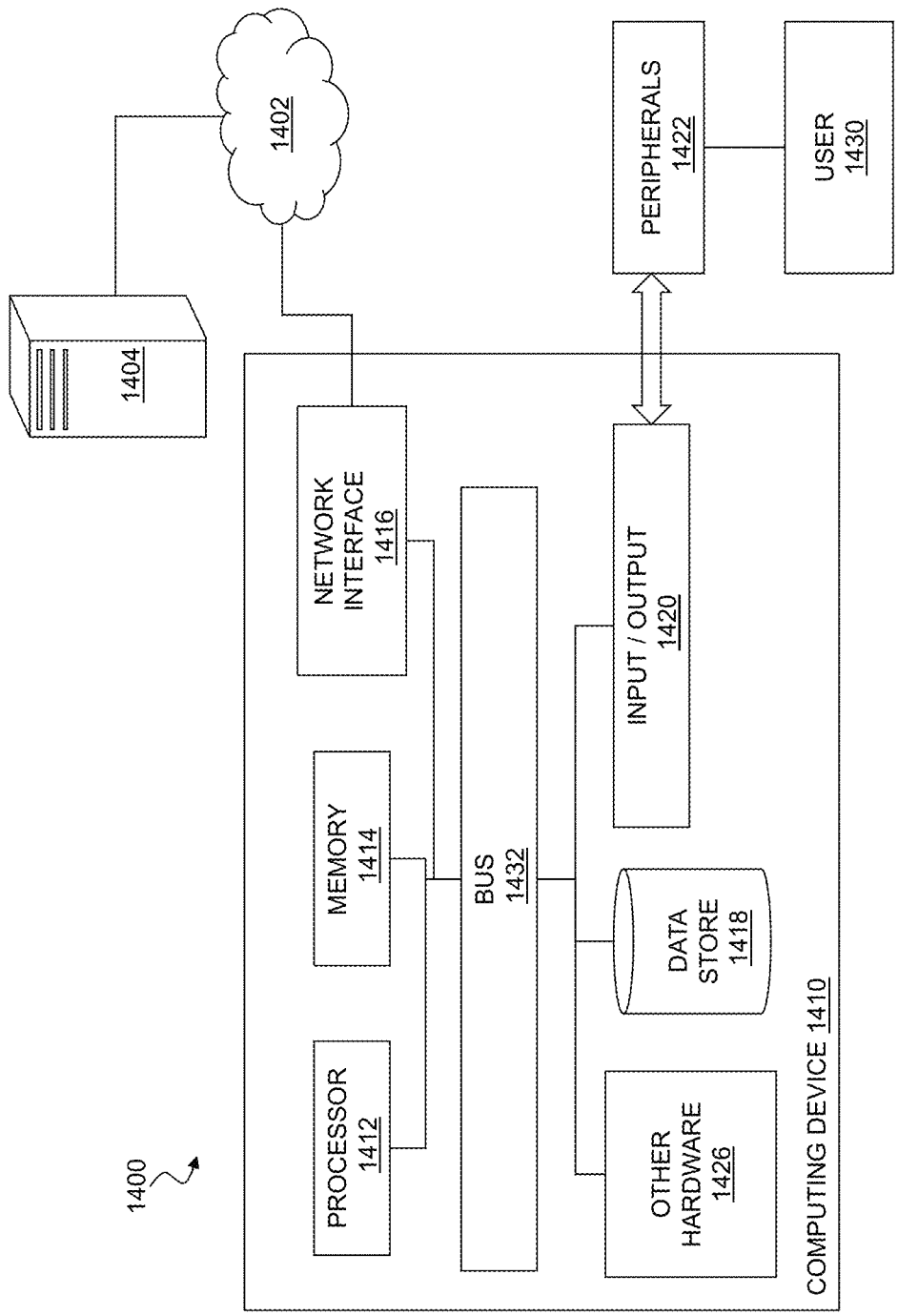

CULTIVATION SYSTEM AND METHODS

CROSS-REFERENCE TO RELATED APPLICATIONS

This application is related to co-pending U.S. application Ser. No. 15/707,462, entitled "Cultivation System and Methods" by the same inventors, filed on the same day as the present application, the entirety of which is incorporated by reference.

This application is related to co-pending U.S. application Ser. No. 15/707,526, entitled "Cultivation System and Methods" by the same inventors, filed on the same day as the present application, the entirety of which is incorporated by reference.

TECHNICAL FIELD

The present invention relates to plant cultivation, more particularly to systems and methods of planting, growing and harvesting a plant or other multicellular organism.

BACKGROUND

Cultivation of plants in mass quantities is costly and presents several challenges to a cultivator. Growers and cultivators are faced with limited resources needed for adequately and successfully growing and harvesting large quantities of plants and crops. Valuable resources necessary for cultivation of most plants, including water, soil, nutrients, utilities, contamination control, and real-estate, are often costly and in short-supply and, as such, can make plant cultivation expensive, environmentally unfriendly and limited in quantity. While the advent of hydroponics (i.e., a method of growing plants without the use of soil) has alleviated some limitations, there is still a need for a cost effective, efficient and scalable system and method for cultivating plants.

SUMMARY

Systems and methods for cultivating plants are described. Aspects of the system may provide for efficient, cost-effective and large scale growing environments. Generally, the system may include a tower structure having a column with a vertical series of vessels for holding a netted pot or other container. The system may have a pressurized irrigation system that is in fluid communication with each vessel. The system may further include lamps to provide an adequate energy source. The system may also include sensors, monitors and controls to establish and maintain ideal environmental conditions suitable for proper plant growth.

The system may further be implemented as a scalable system in which multiple tower structures may be installed into a scaffold system. Sets of towers may be slidably affixed to a scaffold such that the towers may be slid along a track thereby creating easy access to the plants, vessels, lights and irrigation system.

In yet another scalable feature, the system may be expanded to include multiple scaffolds affixed to a frame or compartment interior. Each scaffold, including multiple sets of grow towers, may be slidably affixed to the frame or a track in the compartment. Further, the grow towers may be slidable across the scaffold allowing for the creation of multiple grow aisles separated by an access aisle through the multiple scaffolds affixed to the frame. The system's irrigation system may be in fluid communication with the manifolds of each of the grow towers. The system may further include a control unit in communication with several environmental monitors and controllers. The control unit may be programmed to adapt and adjust the environment in which the system is deployed to create an ideal environment for plant growth.

DESCRIPTION OF THE DRAWINGS

The above and other objects of the present invention will become more readily apparent from the following detailed description taken in connection with the accompanying drawings.

FIG. 7 depicts a perspective view of a multi-tower scaffold assembly.

FIG. 8 depicts a side-view of a multi-tower scaffold assembly.

FIG. 14 illustrates a computer system.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially," or the like, when accompanying a numerical value or direction are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

Figure 1:
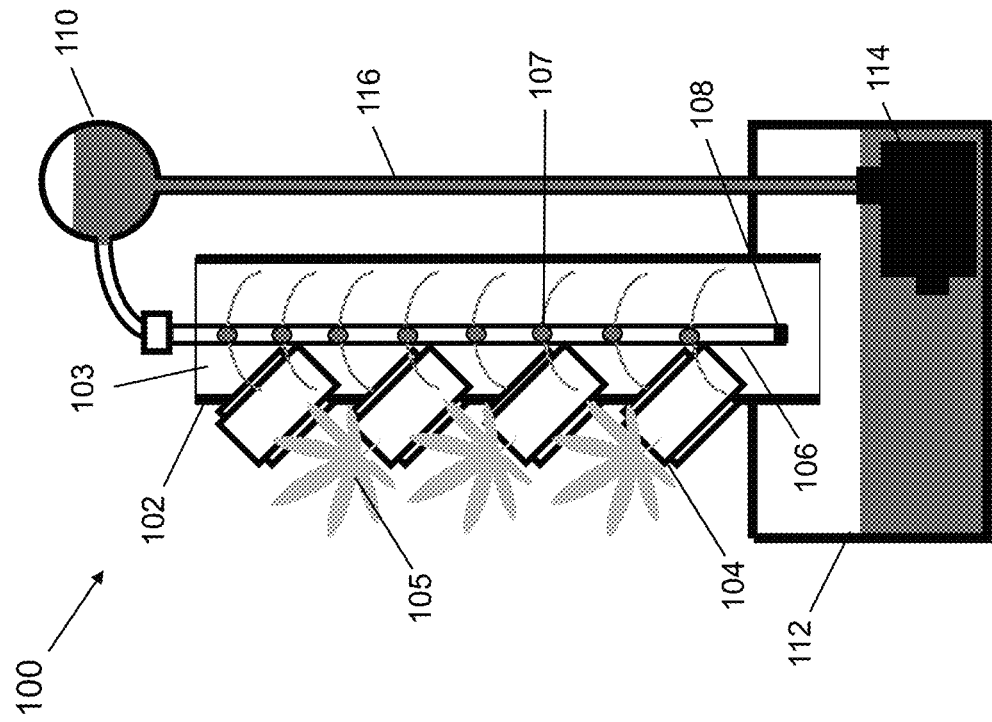
FIG. 1 depicts a grow tower assembly.

FIG. 1 depicts a grow tower assembly 100. The grow tower assembly 100 may include a column 102 and define a plurality of vessels 104 for retaining a plurality of plants 105. The grow tower assembly may include and be in fluid communication with an irrigation system for providing water and nutrients to the column 102. In one aspect, the grow tower assembly 100 may be implemented as a hydroponic growing system where the closed irrigation system provides nutrient filled water to the plants 105, planted without soil.

The column 102 may include or define the plurality of vessels 104 arranged substantially vertically on the column 102. Each of the vessels 104 may be defined at an angle offset from the central axis of the column 102. Each vessel may be fitted with a netted pot (not shown), or other suitable open container for holding and maintaining a plant 105. The column 102 may define a conduit 103 extending through the center of the column 102. In one aspect, the column 102 may be formed or molded as a single body from a hard plastic, such as PVC, defining the plurality of vessels 104. Alternatively, the column 102 may be or form a supporting frame structure for receiving or affixing the vessels 104 thereto.

The irrigation system may include a manifold 110, a reservoir 112, a pump 114 and additional plumbing 116 or piping establishing fluid communication between the manifold 110 and the reservoir 112. The irrigation system and its various components may include piping, rigid or flexible, made from suitable plumbing materials such as PVC, other plastics, copper or any combination thereof. The components of the irrigation system many be joined using known and well-understood plumbing techniques, including clamps, welds, friction fits, screw connections, and the like. The irrigation system may be configured to deliver fluid to the plants 105 planted in the vessels 104. As described throughout, the fluid intended for the irrigation system may include, separately or in combination, water, nutrients, growth simulants and other additives to aid plant growth.

A pipe 106 in fluid communication with the irrigation system, via the manifold 110, may be disposed through the conduit 103 of the column 102. The pipe 106 may be formed from a plastic such as PVC, or may be copper or other plumbing material suitable for fluid transport. The pipe 106 may include perforations 107 along the length of the pipe 106 that establish fluid communication with the vessels 104 and the netted pots disposed therein. The perforations may be formed and sized, as explained further below, to provide a pressurized release of fluid to the plants 105 disposed in the vessels 104.

A cap 108 may be affixed to the end of the pipe 106 at or below a level lower than the lowest vessel 104 of the pipe 102. The cap 108 may be in the form of a plug, stopper, lid, seal, or the like to prevent the flow of fluid from the bottom of the pipe 106. The cap 108 may be affixed to the pipe in any number of ways including, but not limited to, a screwing fixture, adhesives, clamps, friction fit, snap fit, or other known modes of attachment. Alternatively, the pipe 108 itself may be formed with a closed end, eliminating the need for a cap 108. The cap 108, or sealed pipe 106, may pressurize the irrigation system, including the pipe 106. In one aspect, the manifold 110 may be located at a height above the column 102. The fluid in the pipe 106, therefore may be pressurized by the gravitation force on the fluid in combination with the cap 108 plugging the pipe 106. Under pressure, the fluid in the pipe 106, may flow, or spray from the perforations 107 in the pipe 106 to provide effective and efficient irrigation to the vessels 104 and the plants 105.

In one aspect, the reservoir 112 may be open to and located below the column 102 to hold, catch or maintain a fluid reserve. Excess fluid provided to the plants 105 may flow from the vessels 104 or the plants 105 and may be collected in the reservoir 112. A pump 114 may be in fluid communication with the reservoir 112 and the manifold 110. The pump 114 may be disposed in the reservoir 112, or may be placed elsewhere in fluid communication with the reservoir 112 via the additional plumbing 116. The pump 114 may include an input port that intakes the fluid from the reservoir 112 and outputs it, via an output port, to the manifold 110 for distribution to the pipe 106. The pump 114 may also further pressurize the irrigation system to provide and maintain increased pressure to ensure an adequate spray from the perforations 107 in the pipe 106. The capped pipe 106 may provide a pressurized delivery mechanism that yields a more efficient and effective watering process than a traditional gravity-drip or unpressurized watering system. Additionally, in one aspect, the use of a raised manifold 110 as a second reservoir above the column 102, may allow for proper pressurization of the pipe 106 without putting additional stress on the pump 114 or having to maintain a fully closed (i.e., air-tight, leak-proof) and pressurized irrigation system.

Figure 2:
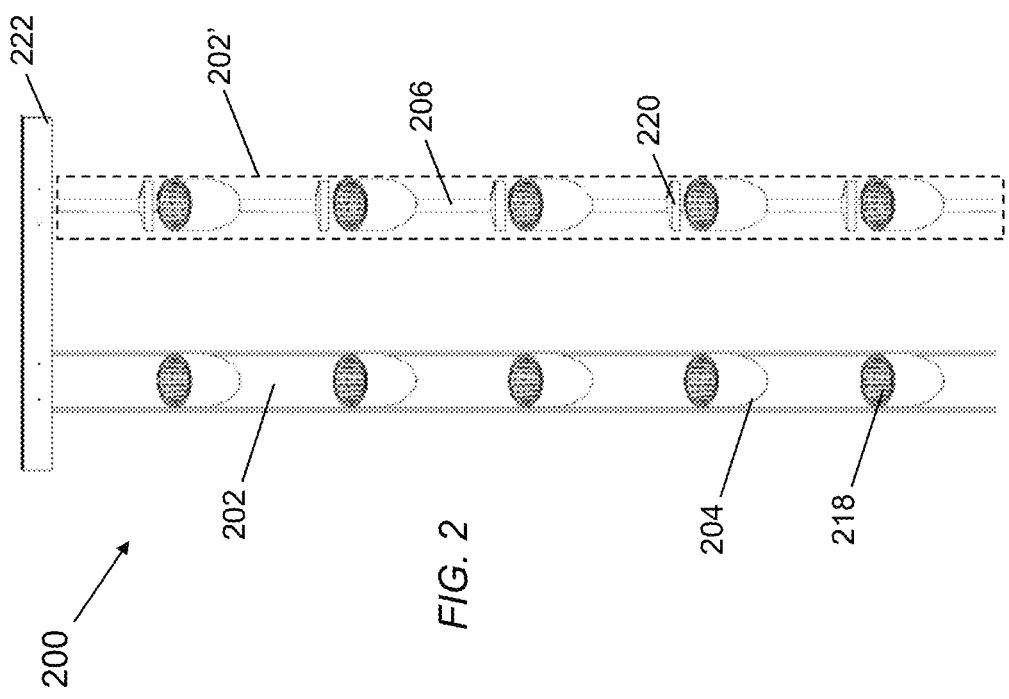
FIG. 2 depicts a partial cut-away, head-on view of a multi-tower assembly.

FIG. 2 depicts a partial cut-away, head-on view of a multi-tower assembly 200. In one aspect, the assembly 200 may include two or more columns 202, 202' hanging vertically from a brace 222. The columns 202, 202' may be affixed to the brace 222 using any suitable attachment technique, including but not limited to, screws, nails, adhesives, welds, friction fits, rivets, or the like. For purposes of visualization, the left column 202 is fully shown. The right column 202' depicts a cut-away view of the tower with the column walls removed, revealing the pipe 206. Each column 202, 202' may include a plurality of vessels 204 arranged vertically along one or more sides of the column 202. As shown by the right column 202', the pipe 206 may run through a conduit of the pipe 206 that establishes fluid communication with the vessels 204 and a plurality of netted pots 218 disposed therein. Caps 220 that may be of varying shape and size, such as pyramid caps, may be placed on or around the pipe 202' and located in between each of the vessels 204 to help divert and redirect excess fluid within the columns 202, 202' toward other plants and down to the reservoir for redistribution. The caps may also help contain and support a root mass from each plant that extend into the tower.

Figure 3:
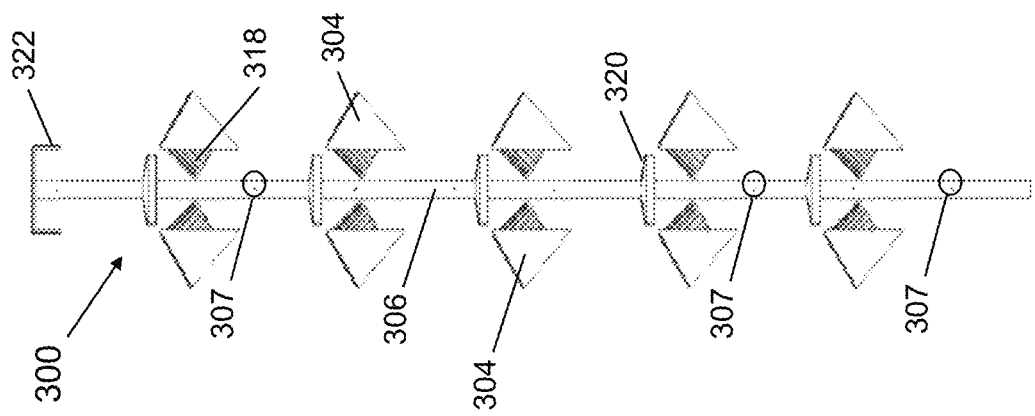
FIG. 3 depicts a cut-away, side-view of a tower assembly.

FIG. 3 depicts a cut-away, side-view of a tower assembly 300. The assembly 300 is depicted as a cut-away view with the walls of the column removed for illustrative purposes. One or more columns may be affixed to a brace 322, as previously described. The vessels 304 may be disposed on multiple sides of the column 302 to maximize grow space. The vessels 304, as depicted in FIG. 3, may be located on opposing sides of the column. Each vessel 304 may include a netted pot 318 disposed therein. The pipe 306 may extend from the top of the column 302 to below the lowest vessel 304. Perforations 307 in the pipe may establish fluid communication between the pipe and the vessels 304 and the netted pots 318. Caps 320 may be placed around the pipe 306 and located between each of the vessels 304 to help divert and redirect excess fluid toward other plants and down to the reservoir for redistribution, and contain and support the root mass from each plant that extend into the tower. The caps 320 may be pyramid shaped or may be any other shape that functionally allows the redirection of fluid and support of the root mass.

Figure 4:
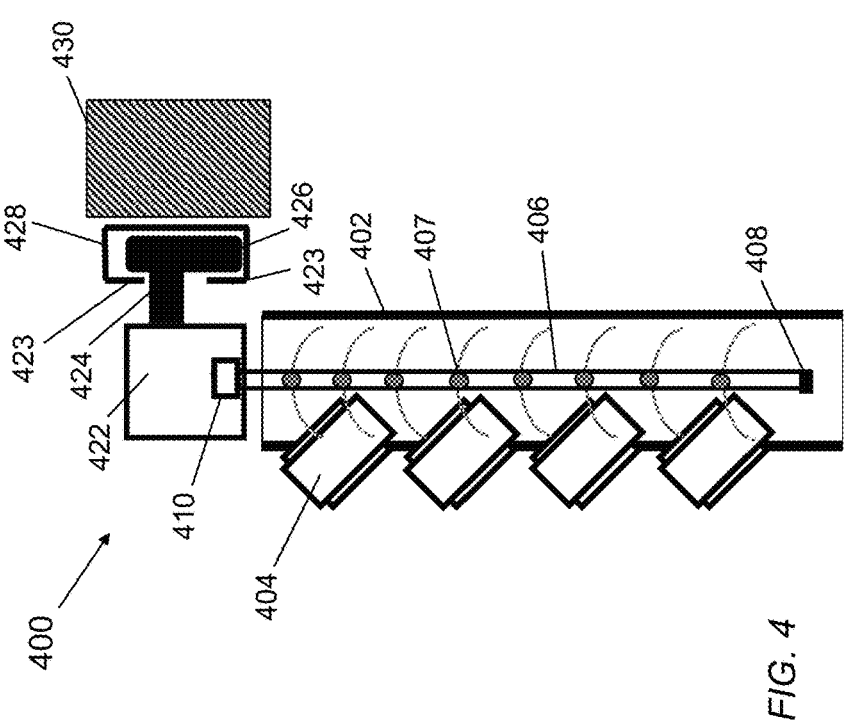
FIG. 4 depicts a side view of a grow tower assembly.

FIG. 4 depicts a side view of a grow tower assembly 400. The grow tower assembly 400 may include a column 402, a plurality of vessels 404, a pipe 406 defining a plurality of perforations 407, a cap 408, a manifold 410, and a brace 422 similar to those previously described herein. In general, the grow tower assembly 400 may include additional structural components to provide for attachment to a beam 430. The beam 430 may be part of or affixed to a scaffold or other supporting structure. In one aspect, the grow tower assembly 400 may be moveably affixed to a scaffold. In one such arrangement, the brace 422 may be fixedly attached to a support 424, which may, in turn, be connected to a sliding element 426. The sliding element 426 may be in the form of one or more wheels, disks, bearings, magnets or other suitable components allowing for reduced-friction movement across a track, rail, slide, hanger, or bracket, such as a rail bracket 428. The rail bracket 428 may be fixedly attached to the beam 430, and may include or form one or more flanges 423 or other such retaining components to ensure retention of the sliding element 426. The beam 430 may be installed on a scaffold, cage, frame or other structure, as explained in further detail below, such that the grow tower assembly 400, may be moved along the rail bracket 428 and the beam 430 in a sliding or other low-friction movement.

Figure 5:
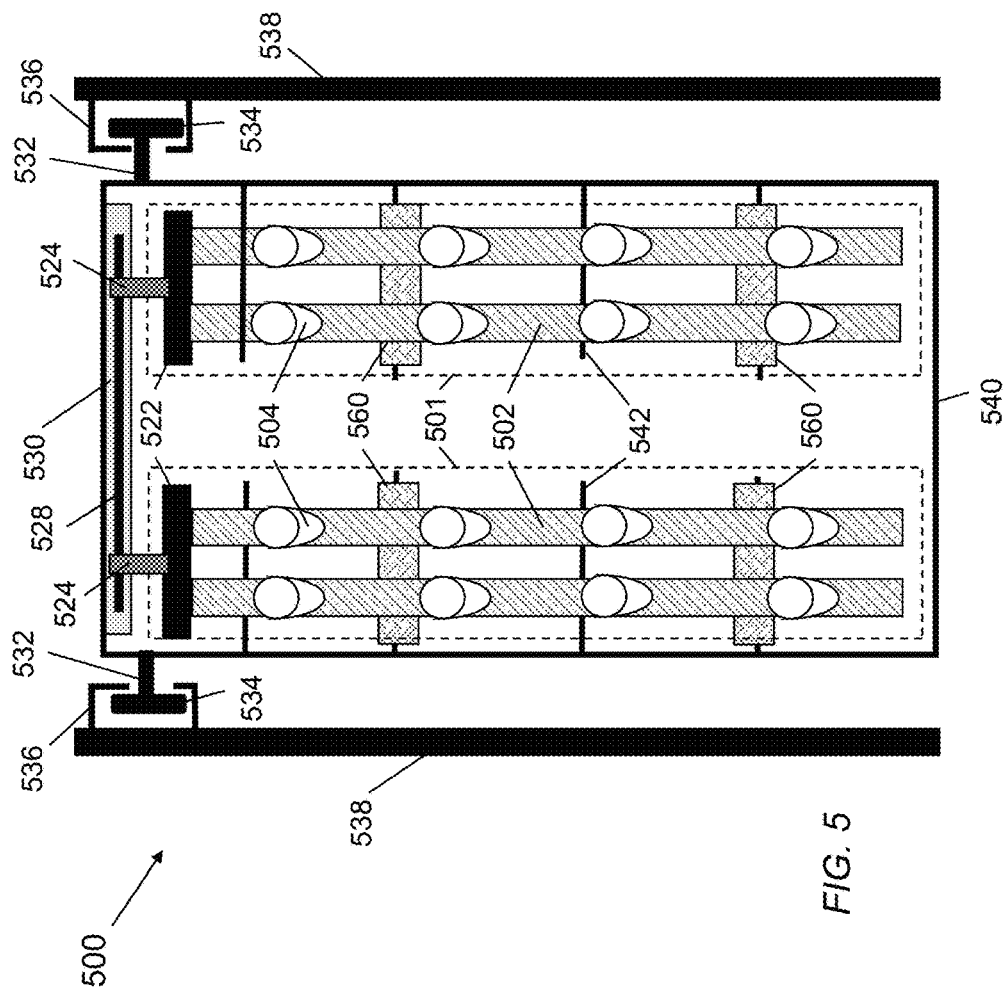
FIG. 5 depicts a head-on view of a multi-tower scaffold assembly.

FIG. 5 depicts a head-on view of a multi-tower scaffold assembly 500. The multi-tower scaffold assembly 500 may include a scaffold 540 for holding or receiving one or more multi-tower assemblies 501. Each multi-tower assembly 501 may include two or more columns 502, each with a plurality of vessels 504 and a brace 522. As previously detailed, each column 502 may include a conduit and a perforated pipe (not shown) extending through the column 502. The pipes may also be in fluid communication with an irrigation system (not shown) as described herein.

In one aspect, the scaffold 540 may be a framework, cage, or other structure made of metal, wood, high-density plastic or other rigid material, or a combination thereof. The scaffold 540 may include a beam 530 and a series of struts 542. The beam 530 may be fixedly attached to the scaffold 540 and may also include a track 528 affixed to the beam 530. Each multi-tower assembly 501 may include a support 524 and additional hardware components, such as those previously described, for attachment of the multi-tower assembly 501 to the track 528 on the beam 530. The struts 542 may be horizontally arranged across one or more sides of the scaffold 540. Alternatively, the scaffold may also or instead include vertical struts. The struts may be adapted to hold or receive lamps 560, environmental sensors, utility wires or cables, or other equipment used to cultivate the plants. In one aspect, the lamps 560 may be attached to the struts 542 and aligned according to the location and angles of the vessels 504 in such a way to maximize the necessary light required to form an ideal growth environment for the plants. The lamps 560 may be LED lamps, such as 660 W LED lamps, incandescent or fluorescent lamps, infrared lamps, or other suitable energy source.

In another aspect, the scaffold assembly 540 may be moveably attached to or hung from a larger structure such as a frame 538. The frame 538 may take the form of an open three-dimensional frame or skeletal structure or may be in the form of a walled or partially-walled compartment or enclosure, such as a shipping or intermodal freight container. In another aspect, the scaffold 540 may include scaffold supports 532 and sliding components 534. The frame 538 may include a track, rail, slide, hanger, bracket or other suitable structure such as a rail bracket 536 to hold or receive the sliding elements 534 of the scaffold 540. In such an arrangement, the scaffold 540 may be moved in a sliding, or other low-friction, movement through the frame 538, allowing for easy installation and arrangement of one or more scaffolds 540 within the space defined by the frame 538. While the system and components shown in FIG. 5 include a rail bracket 538 with an engaging sliding element 536, one of skill in the art will recognize that other mechanisms, such as wheels, disks, bearings, magnets, or other reduced-friction components may be implemented without deviating from the scope of the invention. Further, while the scaffolds 540 and other supporting structures described herein may be generally depicted as three-dimensional rectangular structures, one of skill in the art will recognize that scaffolds 540 and frames 538 may be implemented in other shapes and sizes, including without limitation, circular, oval, cubed, cylindrical, triangular, or any other regular, irregular, symmetric or non-symmetric polygon, to allow for maximum use of a given amount of space or volume.

Figure 6:
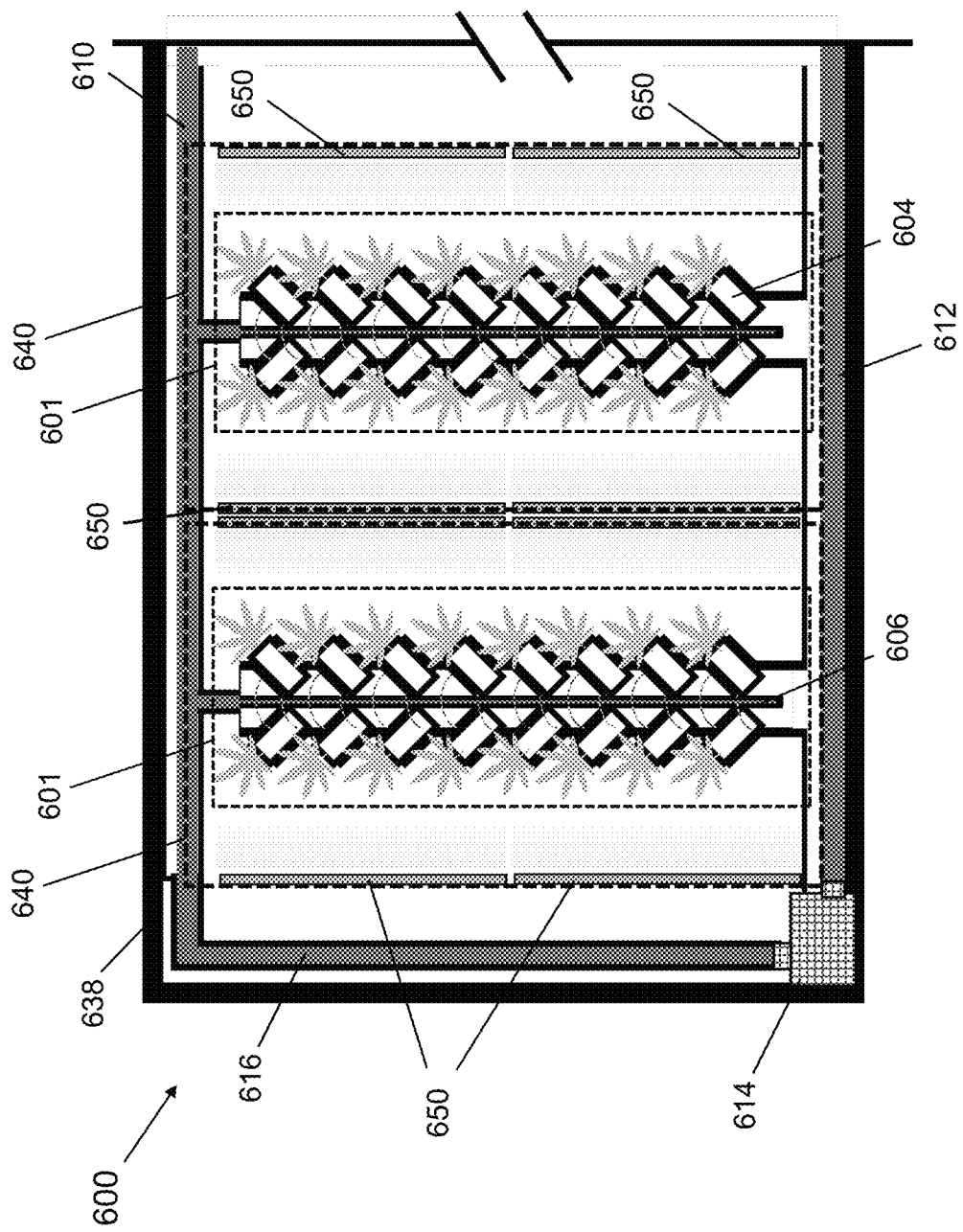
FIG. 6 depicts a conceptual, side-view of a multi-tower grow environment.

FIG. 6 depicts a conceptual side-view of a multi-tower grow environment 600. In general, the multi-tower grow environment may include a frame 638 that houses or hangs one or more grow tower assemblies 601 or scaffold assemblies 640, as previously described. The frame 638 may be a skeletal framework, an enclosure, a compartment or other structure suitable for holding or hanging the scaffold assemblies 640 containing the grow tower assemblies 601. The scaffold assemblies 640 may include lamps 650 affixed thereto to provide light to the plants residing in the vessels of the grow tower assemblies 601.

The multi-tower grow environment 600 may further include an irrigation system that includes a manifold 610, a reservoir 612, a pump 614, and additional pipes or plumbing 616 establishing fluid communication therethrough. In one aspect, the manifold 610 may be a common-distribution manifold located above the grow tower assemblies 601 and be in fluid communication with the capped pipes 606 of the individual grow towers. In such an arrangement, and in combination with the capped pipes 606 of the grow tower assemblies 601, gravity may act upon the fluid in the manifold 610 to pressurize the capped pipes 606 and establish a spray dispersion of the fluid, via the perforations in the capped pipes 606, to the vessels 604 and the plants disposed therein. The manifold 610 may also or instead be in fluid communication with the pump 614 to maintain pressurization as well as recirculate fluid from the reservoir 612 to the manifold 610. The pump 614 may be disposed in or near the reservoir 612 or may be located outside of the reservoir 612 with additional plumbing providing fluid communication with the other components of the irrigation system.

In one aspect, the reservoir 612 may be an open, common collection reservoir disposed and extending beneath the grow-tower assemblies 601 throughout the frame 638. In such a configuration, excess fluid that is not absorbed or held by the plants, vessels 604 or pipes 606 may be collected in the reservoir 612 for redistribution to the manifold 610, via the pump 614, and recirculation to the grow tower assemblies 601.

FIG. 7 depicts a perspective view of a multi-tower scaffold assembly 700. In one aspect, the scaffold 740 may include a beam 730 affixed to and extending across the scaffold. The beam 730 may also or instead include any supporting element or structure capable of receiving, holding and withstanding the weight of the multi-tower grow assemblies. The scaffold 740 may also include a plurality of struts (not shown) for holding or receiving a plurality of lamps 750. The multi-tower scaffold assembly 700 may also include the multi-tower grow assemblies, including the columns 702 and the vessels 704, attached to the braces 722 which are, in turn, attached to the beam 730. As previously described, the braces 722 may be attached to the beam 730 in a moveable fashion, such as a track or other sliding engagement, to allow the braces 722, and the attached grow towers to slide across the width of the scaffold as indicated by the directional arrows 731. As explained in detail below, the sliding attachment of the grow tower assemblies to the beam 730 and the scaffold 740 may allow access to the grow towers and the plants disposed therein, particularly in arrangements featuring multiple scaffolds combined in a confined space or area.

The multi-tower scaffold assembly 700 may further include attachment structures for attaching the scaffolds 740 to a frame, compartment or container. In one aspect, the attachment structure may include one or more tracks 736 or rails disposed at or near the sides of the scaffold 740. Alternatively, the scaffold may be attached to the frame or compartment by tracks, rails or other guiding structures located on one or more of the top, bottom, or sides of the scaffold 740. The tracks 736 may be fixedly attached to a frame or a wall of a compartment and may receive the scaffold 740 in a sliding engagement to allow the scaffold 470 to move or slide the length of the track 736, as indicated by the directional arrow 733. As described below, the frame may also or instead include a stand-alone frame built to maximize the space of a given volume.

FIG. 8 depicts a side-view of a multi-tower scaffold assembly 800. The scaffold 840 may include a beam 830 and struts for the holding or receiving of a plurality of lamps 850 and other equipment. The lamps 850 may be arranged and aligned to provide ideal lighting conditions for the plants disposed in the vessels 804 of the columns 802. The grow towers, as previously detailed, may be attached to a brace 822, which may be attached to the beam 830 in a sliding arrangement. The track 836 may be affixed to a framework or compartment for sliding engagement allowing the scaffold 840 to move the length of the track 836, as indicated by the directional arrow 831.

Figure 9:
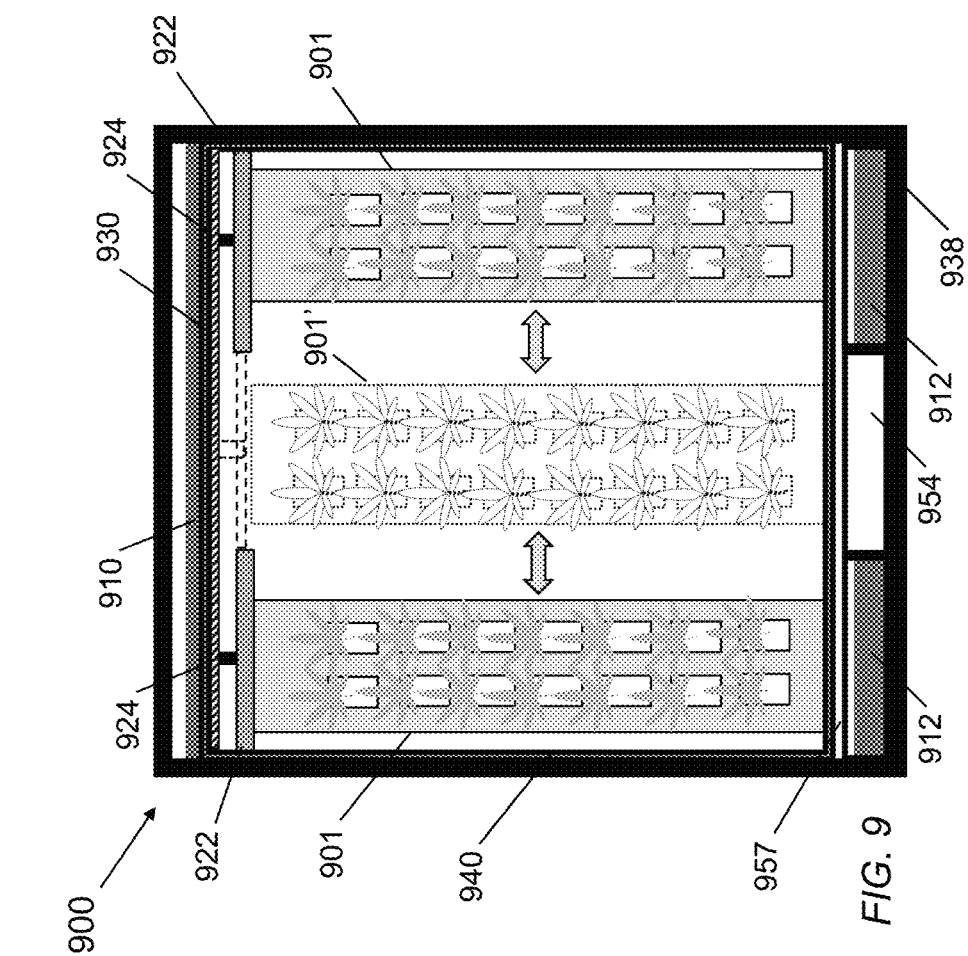
FIG. 9 depicts a conceptual, head-on view of a multi-tower grow environment.

FIG. 9 depicts a conceptual head-on view of a multi-tower grow environment 900. The multi-tower grow environment 900 may be housed, contained or implemented in or on a frame 938 that receives, holds, hangs or otherwise maintains one or more scaffolds 940. The tower assemblies 901, including the braces 922 and the supports 924, may be attached to a beam 930 affixed to the scaffold 940. The multi-tower grow environment 900 may also include an irrigation system including a manifold 910 disposed above and extending across the tower assemblies 901 and a reservoir 912 located beneath. In one aspect, an access area 954 may be defined between two portions of the reservoir 912. The access area 954 may be suitable for running, cables, wires, additional plumbing, or other equipment necessary for creating and maintaining an ideal grow environment. The frame 938 may also include or provide for a floor 957 disposed above the reservoir 912 and access area 954. The floor 957, in one aspect, may be a grated floor to allow the excess flow of fluid from the multi-tower grow assemblies 901 to the reservoir 912. Alternatively, the floor may also or instead include one or more drains disposed therein to funnel, divert or redirect any fluid to the reservoir 912, or another fluid receptacle or outlet. As explained in further detail below, the floor 957 may provide a walking surface for a technician or cultivator to walk through the frame 938 to access the plants, tower assemblies 901 or other equipment contained within the frame 938.

In one aspect, the two tower assemblies 901 may be initially positioned at opposite sides of the scaffold, creating an access aisle between there between. As described above, the tower assemblies 901 may be attached to the beam 930 and scaffold 940 in a moveable fashion such that the tower assemblies 901 may be moved or slid on a track towards the center of the scaffold 940, depicted as tower assemblies 901'. In one aspect, when multiple scaffolds 940, holding multiple tower assemblies 901 are positioned in close proximity to each other within the frame 938, to maximize grow area, the maneuverability of the tower assemblies 901 towards the access aisle offers easy access to the plants and the tower assemblies 901. Often, and with particular plants, crops, or other hydroponically grown organisms, the plants themselves may require maintenance. If, for example, plants need to be trimmed, replanted, or otherwise cared-for, the ability to move the tower assembly 901 out from the confines of the crowded side portions of the frame 938 and into a center access aisle, provides a great advantage to a cultivator maintaining the plants or a technician servicing or repairing the system. The cultivator may walk through the frame 938 to the tower assembly 901 requiring attention, slide the tower assembly 901 to the center of the scaffold 940, perform the required maintenance, and slide the tower assembly 901 back to its original location at or near the side of the scaffold 940. Not only does the described configuration allow for easy access to the plants and equipment, it also allows for drastically increasing the quantity of plants that can be grown in very close proximity, maximizing the yield of the crop.

Figure 10:
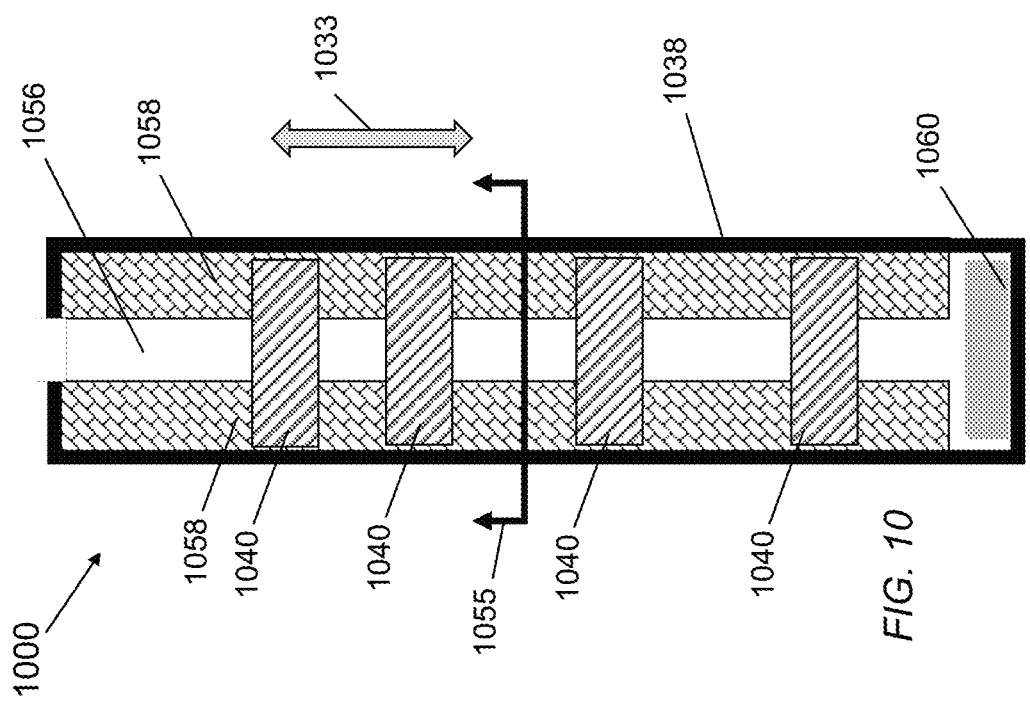
FIG. 10 depicts a conceptual, top-down view of a multi-scaffold grow environment.

FIG. 10 depicts a conceptual top-down view of a multi-scaffold grow environment 1000. Referring to FIG. 9, the head-on-view of the multi-tower grow environment 900 is depicted as the cross-sectional view, taken across arrow 1055, of the top-down view of FIG. 10. In general, the multi-scaffold grow environment 1000 includes a configuration of equipment and grow space that maximizes yield, yet offers significant savings on valuable resources, including but not limited to water, electricity, other utilities and real-estate. In one aspect, the multi-scaffold grow environment 1000 may be configured or implemented in a compartment or a container 1038 such as a shipping or intermodal freight container. The container 1038 may include a frame as part of the container or affixed thereto. The frame, alternatively may be the container itself or a portion thereof. As detailed herein, the container 1038 may include a track system onto which a plurality of multi-tower scaffold assemblies 1040 may be hung or otherwise placed. Each scaffold assembly 1040 may be placed in or on the track and moved through the container 1038, as indicted by directional arrow 1033. Advantageously, the number of scaffold assemblies 1040 may be expanded to maximize as many scaffold assemblies 1040 as the depth of the container 1038 may accommodate. The frame may also or instead be formed to conform to an existing volume or geometry of a given space.

In one aspect, the arrangement and configuration of the multi-tower assemblies within each scaffold assembly 1040 may form or otherwise define two grow area aisles 1058 separated by an access aisle 1056 therebetween. The positioning of the multi-tower assemblies on the outer edges of the scaffold assemblies 1040 and the container 1038 allow a cultivator or technician to walk through the container 1038 to access each of the scaffold assemblies 1040 and the grow towers contained therein. While the illustrative example of FIG. 10 depicts four scaffold assemblies 1040, the number is merely illustrative and additional scaffold assemblies 1040 may be installed back-to-back to maximize the number of plants grown in the container 1038 at one time. One skilled in the art will appreciate that when the maximum number of scaffold assemblies 1040 are installed onto the frame 1038 or container, access to the grow areas aisles is limited. Providing further ease of access may be the sliding arrangement of the grow tower assemblies within the scaffold assemblies 1040. A cultivator or technician may walk down the access aisle 1056 to the scaffold assembly 1040, slide the grow-tower assembly from the grow area aisle 1058 into the access aisle 1056 and perform whatever maintenance or planting operations are necessary.

In one aspect, the multi-scaffold grow environment 1000 may include a control unit 1060. The control unit 1060 may be located on or within the container 1038, or may be located remotely. In one aspect, the control unit 1060 may serve to maintain and control the environmental conditions in which the plans are grown. The control unit 1060 may be in communication with several environmental controllers and sensors located throughout the multi-scaffold grow environment 1000. Environmental controllers may include, without limitation, air conditioners/heaters, humidifiers/dehumidifiers, lamp controllers, vents, and carbon dioxide tanks. Sensors for environmental conditions, such as temperature, humidity, air quality, oxygen, carbon dioxide, light quantity or intensity, may be placed throughout the container 1038 and be in wired or wireless communication with the control unit 1060. The control unit 1060 may also or instead include monitors and controls for the irrigation system as well, including but not limited to, sensors for water or fluid level, conductivity, fluid pressure, pH, and nutrient/water ratio.

The control unit 1060 may include processors, memory and storage configured to automatically control, activate and adjust the environmental controllers to maintain ideal environmental conditions for the growing environment. The multi-scaffold grow environment 1000 may further include a local area network ("LAN") for interconnection of the control unit 1060, the environmental sensors, and the environmental controllers, as well as other network devices designed and implemented to promote and maintain an ideal growing environment. The local area network may be wired or wireless, and may be connected to a wide-area network ("WAN"), such as the Internet, to provide additional communication pathways.

The control unit 1060 may be programmed or otherwise configured to receive data from the sensors, compare the data from the sensors to preset or programmed threshold ranges, and automatically adjust the environmental controllers to maintain the environment or bring it into the specified ranges. For example, a thermometer or other temperature sensor may report an out of range condition to the control unit 1060, which will, in turn, activate an air conditioner/heater to bring the temperature back into an appropriate range. As another example, a reservoir sensor may indicate a low fluid level, to which the control unit 1060 may activate a water supply to return the fluid level to an appropriate volume, and dispense an appropriate amount of nutrient for plant growth as well as any pH regulators to reestablish a preset condition of the fluid and the irrigation system. Additionally, the control unit 1060 may monitor the environmental conditions and inform or alert a cultivator or technician of an out-of-range condition. In one aspect, the technician may adjust the controllers from the control unit 1060, or may remotely control the control unit and the controllers using an application on a computing device such as a mobile device, laptop, PC, tablet, or other suitable programmable device. The computing device may connect to and interact with the control unit 1060, the sensors or the environmental controllers across the available networks via wired connections (e.g., Ethernet, USB, or the like) wireless connections (e.g., Wi-Fi, Bluetooth, RF, Infrared, CDMA, GSM, or the like), or a combination thereof.

Figure 11:
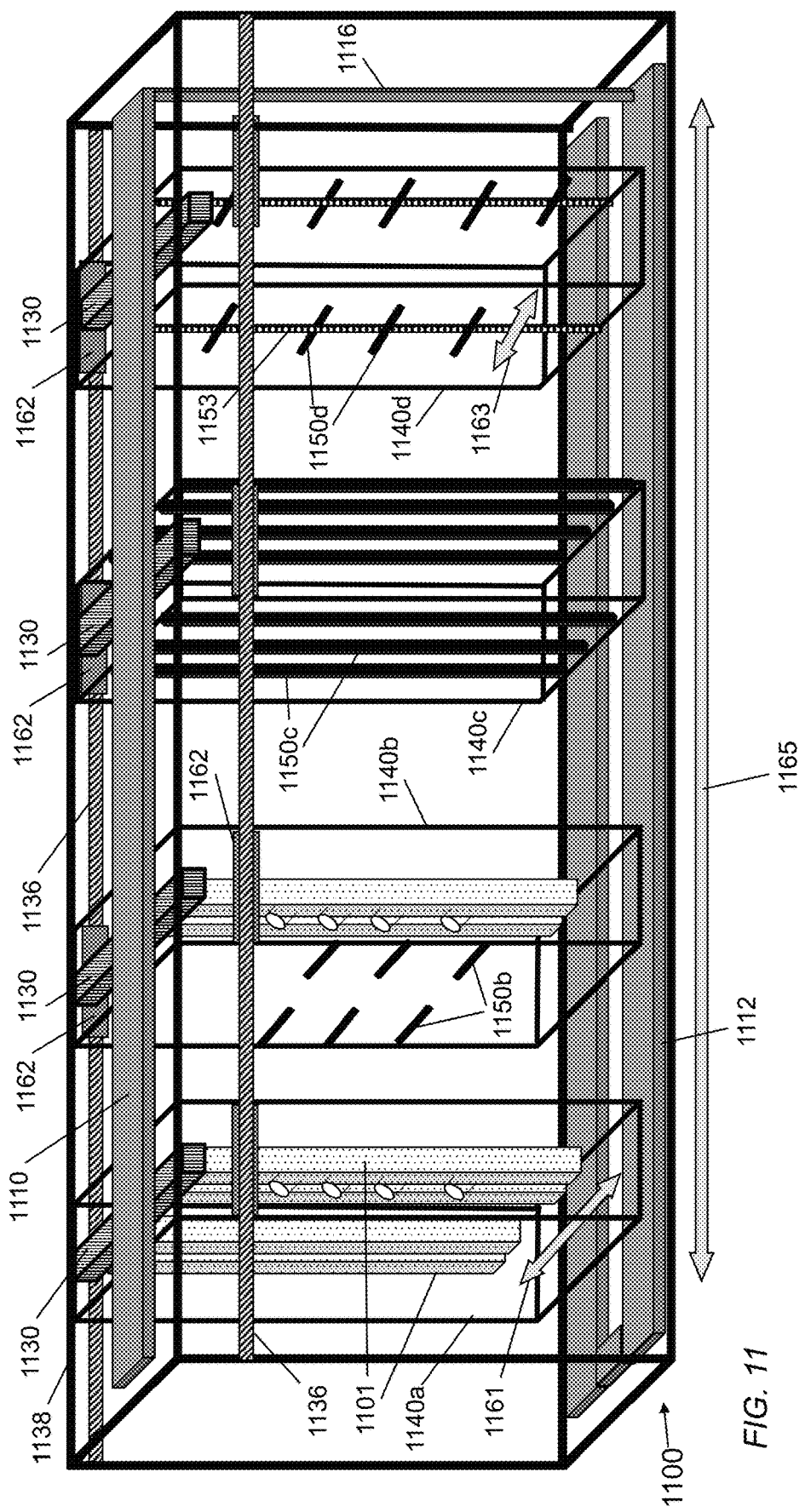
FIG. 11 depicts a perspective view of a multi-tower grow environment.

FIG. 11 depicts a perspective view of a multi-scaffold grow environment 1100. The multi-scaffold grow environment 1100 includes four exemplary scaffold assemblies 1140a-d. One of ordinary skill in the art will recognize that certain features of the scaffold assemblies 1140a-d may be omitted to more clearly highlight other aspects of the system, and that the illustrative depictions of the scaffold assemblies 1140a-d are meant to be interpreted as depictions of various components that may or instead be implemented according to certain aspects of the invention. One of ordinary skill in the art will further appreciate that some or all of the depicted features may be used separately or in combination to form the components of the multi-scaffold grow environment 1100.

The frame 1138 may be a wall-less framework or may be an enclosure or container, as previously described. The frame 1138 is depicted without walls for illustrative purposes. The frame 1038 may include one or more tracks 1136 for receiving and holding a plurality of scaffold assemblies 1140a-d. In one aspect, the track 1136 may include a set of tracks or rails affixed to the opposing sides of the frame 1038 and extending the length of the frame 1038. Alternatively, the track 1136 may be in the form of a central rail or beam located on the top or bottom of the frame, and which receives a bracket or other mounting hardware affixed to the scaffolds 1040a-d, allowing for reduced-friction movement of the scaffolds 1040a-d through the frame. As detailed above, the frame may be in the form of a three-dimensional framework, or may be in the form of a compartment or container, such as an intermodal freight or shipping container.

The multi-scaffold grow environment 1100 may further include an irrigation system including a manifold 1110, one or more reservoirs 1112 and additional plumbing 1116 establishing fluid communication throughout and with the pipes of the individual grow towers. The frame 1138 may further include a control unit (not shown) as previously described to maintain and control the growing environment therein.

The multi-tower scaffold assemblies 1040a-d may each include a beam 1130 and mounting hardware 1162, such as brackets, sliding elements, supports and other hardware to provide for the sliding attachment of the scaffold assemblies 1140a-d to the track 1136 affixed to the frame 1138. When placed onto the track 1136, the scaffold assemblies 1140a-d may move down the track 1136 as depicted by the directional arrow 1165. The multi-tower assemblies 1101 may be attached, via braces or other supporting structures to the beams 1130, in a moveable manner to allow the tower assemblies 1101 to slide laterally across the scaffold to the center of the frame 1138 as depicted by the directional arrow 1161. In one aspect, locking mechanisms may be implemented along the track 1136 and on mounting hardware 1162 to allow each scaffold to be locked in place once installed to prevent accidental movement of the scaffold assembly and secure the scaffolds should the frame 1138 need to be transported.

The scaffold assembly 1140a depicts a four-tower assembly configuration in which two grow towers are included in each of two tower assemblies 1101, totaling the four grow towers in the scaffold 1140a. Each grow tower assembly may be slid or otherwise moved to the center of the scaffold into the access aisle for ease of access and maintenance of the plants and equipment.

In another aspect, the scaffold assembly 1140b may include struts for receiving or holding a plurality of lamps 1150b and other equipment. The lamps 1150 be may be horizontally arranged and aligned with the vessels of the grow towers in such a manner as to maximize exposure of the plants to the light, while minimizing the amount and number of lights used. Additionally, the lamps 1150 may include sensors and other circuitry in communication with the control unit, allowing the lamps 1150 to be controlled remotely to maintain an ideal growing environment.

In another aspect, the scaffold assembly 1140c may include vertical struts and vertically aligned lamps 1150c. The lamps 1150c may be mounted to the vertical struts and aligned and arranged in such a vertical manner as to maximize exposure of the plants to the light, while minimizing the amount and number of lights used. The scaffold assembly 1140c may include struts on one or more sides of the scaffold assembly 1140c to accommodate grow towers (not shown) in which vessels are located on additional, or opposing sides of the individual grow columns.

In yet another aspect, the scaffold assembly 1140d may include lighting structures that include a lamp support 1153 and multiple lamps 1150d. The lamps 1150d may be arranged and aligned with the vessels of the grow towers (not shown) so as to maximize exposure of the plants to the light, while minimizing the amount and number of lights used. The lamp support 1152, in one aspect may also be slidably attached to the scaffold in a manner similar to the grow tower assemblies. For example, the lamp support 1153 may be attached to a track on the scaffold to allow for the lamp support 1153 to move laterally across the scaffold, as depicted by directional arrow 1163. Such a configuration provides easy access to the lamps 1150d (and other equipment attached to the struts) for maintenance, repair or other servicing. A technician may approach the scaffold assembly 1140d via the access aisle, slide the lamp support 1156 across its track into the access aisle, perform the necessary maintenance or service, and slide the lamp support 1156 back to the grow area aisle.

The frame 1138 may be loaded with as many scaffold assemblies 1140a-d as may be accommodated by the depth and volume of the frame 1138. In one aspect, the scaffold assemblies may be horizontally stacked against each other to maximize the number of grow towers 1101 in the frame 1138. Under such a configuration, the number of lamps 1150b-d may be reduced as the energy output by the lamps may be directed at the grow towers 1101 of an adjacent scaffold assembly. Alternatively, separate lamp assemblies may be hung from the frame 1138 in a similar manner as the scaffold assemblies 1140a-d for independent movement and access.

While the embodiments depicted herein include a tower assembly with two towers connected to a single brace, one of skill in the art will recognize that fewer or more grow towers may be implemented in a tower assembly to accommodate variations in volume, output and cultivation resources. Further, while the embodiments depict scaffold assemblies including two tower assemblies attached to a scaffold, it will be appreciated that fewer or more tower assemblies may be implemented without deviating from the scope of the invention.

While the embodiments depicted herein, include a tower assembly attached to a single rail track affixed to a beam, one of skill in the art will recognize that other sliding or moving arrangements may be implemented without deviating from the scope of the invention. Similarly, while the scaffold assemblies are depicted herein as attaching to the frames through engagement of two tracks located on opposite sides of the scaffold, it will be appreciated that the scaffold assemblies may moveably engage with the frame through any number of engagement systems, such as a single top rail, a single bottom rail, a dual top and bottom rail, or the like.

Further, while the embodiments detailed herein describe the maneuverability of the tower assemblies and the scaffold assemblies in a sliding fashion, one of ordinary skill in the art will recognize that additional manners of maneuverability may be implemented without deviating from the scope of the invention, including a stepped or ratcheted movement, gliding movement, spring loaded or mechanically-biased movement, or the like.

Figure 12:
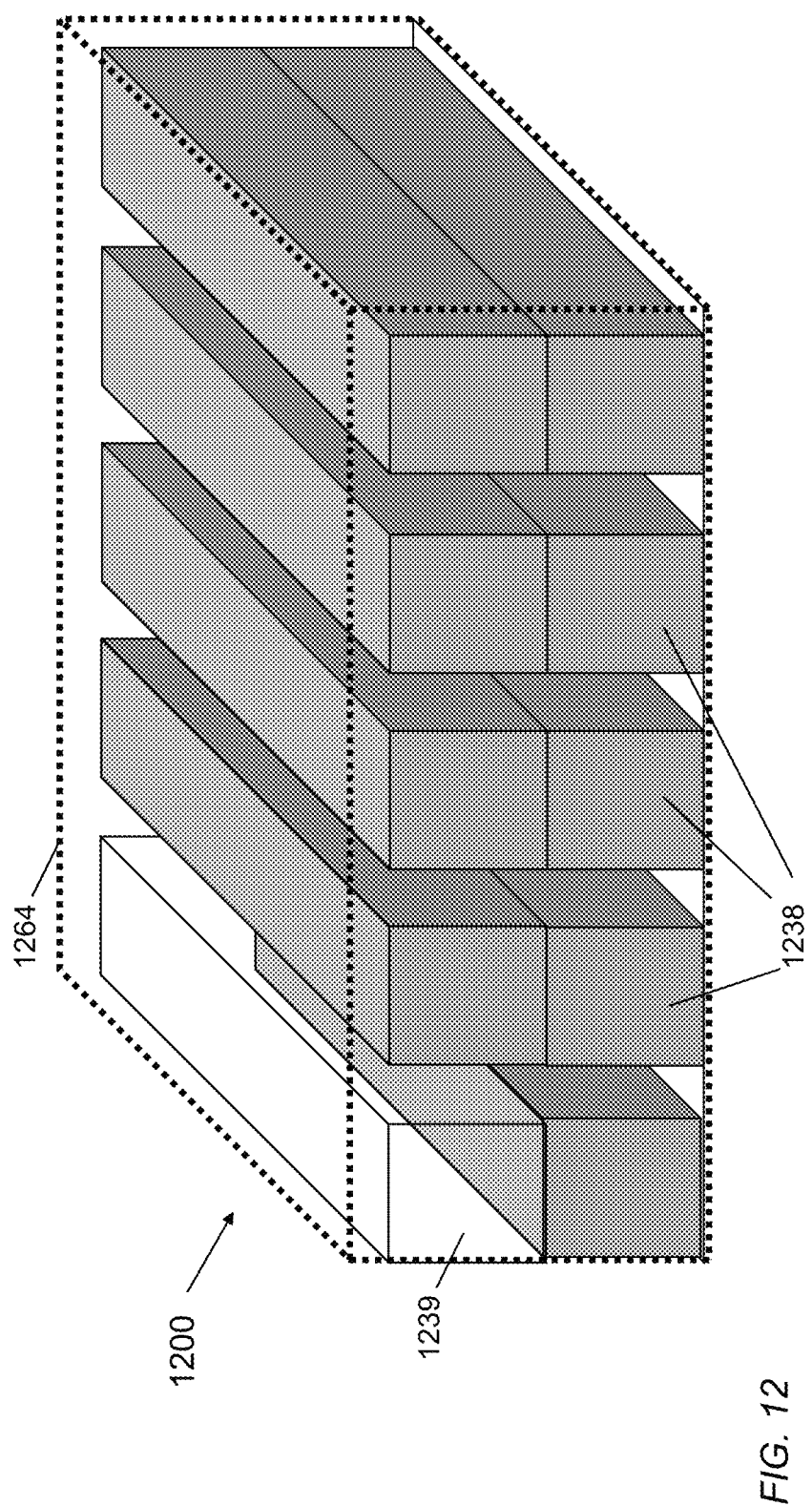
FIG. 12 depicts a perspective view of a multi-container grow environment.

FIG. 12 depicts a perspective view of a multi-container grow environment 1200. In one aspect, the modular and scalable nature of the grow tower assemblies, the scaffold assemblies and the frames or containers 1238 provides for a multi-container grow environment 1200 in which a plurality of containers 1238, such as shipping or intermodal freight containers, may be placed adjacently, stacked or otherwise arranged to establish a large quantity of growing plants in an efficient and cost-effective manner. In one aspect, the containers 1238 and the open frame 1239 may be filled with scaffold assemblies (not shown), each containing multiple grow tower assemblies, and arranged in a stacked and dense configuration to maximize the grow space within a certain volume 1264.

As previously mentioned, a vital, yet scarce resource for the growth and cultivation of crops and mass-produced plants, is real-estate. As real property suitable for growing and sustaining crops or plants becomes scarcer and more expensive, aspects of the present invention allow for the repurposing of retired or extra, freight containers of other structures. These containers may be used to implement the presently disclosed system by converting the spaces within to create effective and cost-efficient growing environments for plants, crops and other multicellular organisms. In addition to real-estate, additional resources such as water, electricity and light are also required for successful cultivation. Those elements may also be in short supply and difficult to effectively control and manage. Aspects of the present invention provide for the ability to densely position, cultivate and harvest plants in such a way as to minimize the required soil, water, electricity and light requirements.

Figure 13:
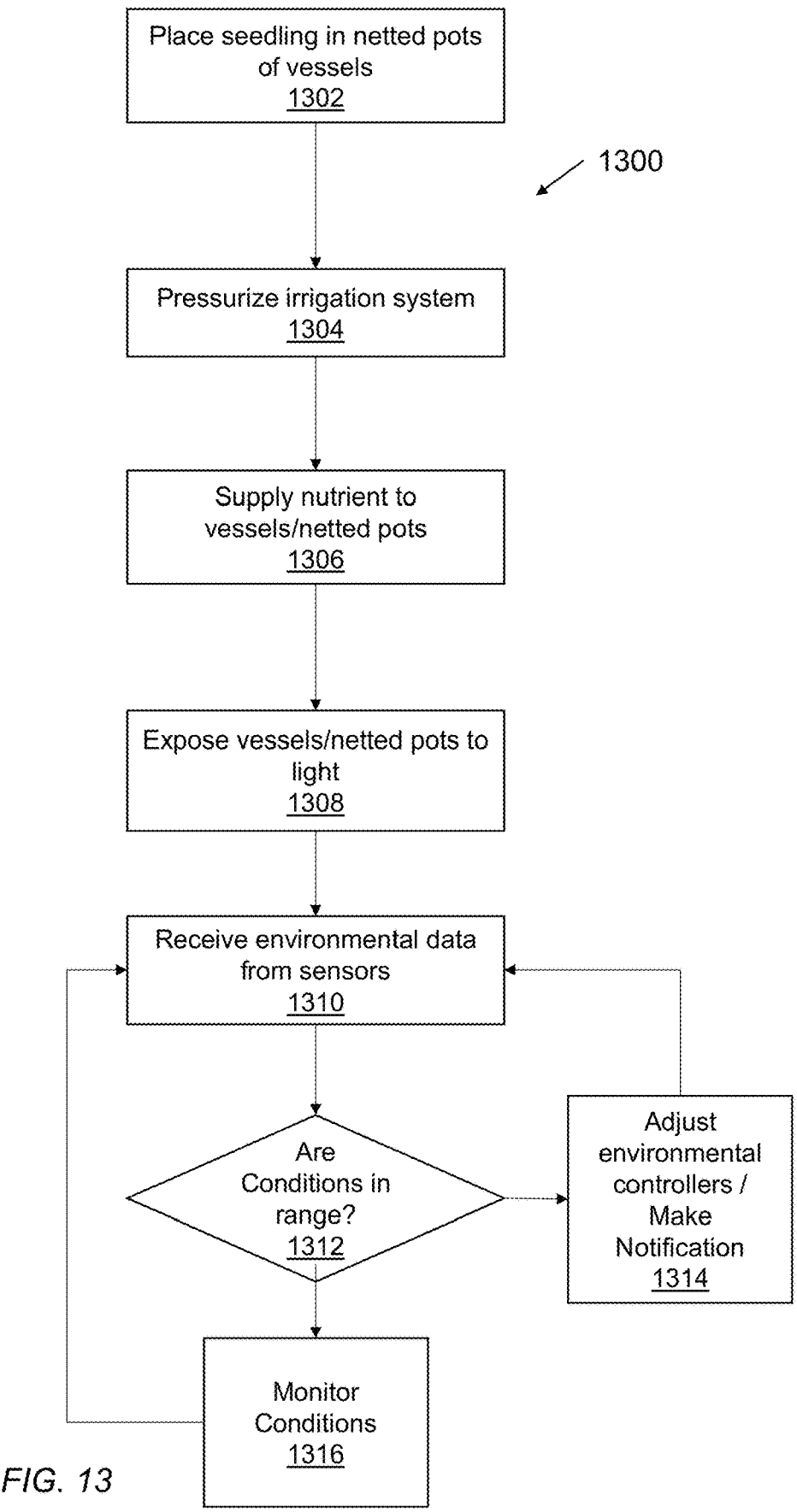
FIG. 13 is a flowchart depicting a method of cultivating a plant.

FIG. 13 is a flowchart depicting a method 1300 of cultivating a plant. The systems described herein may provide for an ideal environment in which to cultivate a large quantity of a plant. As shown in step 1302, the method 1300 may begin by placing seedlings in the netted pots of the vessels of the grown towers. Each of the vessels may be arranged substantially vertically along one or more of the sides of the columns of the grow towers. In one aspect, the grow towers may be hydroponic grow towers, thereby eliminating the need for soil.

As shown in step 1304 the method 1300 may pressurize an irrigation system. In one aspect, the irrigation system may be in fluid communication with a perforated pipe extending through a conduit of the column. The irrigation system may include a manifold located at a height near or above the top of the grow tower. The pipe may be capped or otherwise sealed such that the gravitational flow of fluid in the irrigation system provides a pressurized flow of fluid to the pipe and a spraying distribution of the fluid to the netted pots and vessels via the perforations in the pipe. The irrigation system may further include a pump to assist in pressurization as well as circulate fluid from a reservoir containing excess or additional fluid to the manifold.

As shown in step 1306, the method 1300 may supply a nutrient to the vessels and netted pots. In one aspect, the nutrient may be a mixture of water and other additives intended to promote and stimulate the growth of the plants. The nutrient may be supplied to the reservoir and circulated through the irrigation system by the pump and gravity flow from the manifold. The nutrient mix may be monitored via sensors, such as a conductivity sensor, in the reservoir or irrigation system for proper mixture levels.

As shown in step 1308, the method 1300 may include exposing the vessels and netted pots to light. In one aspect, light may be provided by one or more lamps aligned with the vessels of the grow tower to maximize exposure and minimize the number of lamps. The lamps may be LED lamps, incandescent lamps, fluorescent lamps, infrared, or other suitable energy sources for providing appropriate energy to the plants.

As shown in step 1310, the method may include receiving environmental data from a plurality of sensors positioned throughout the grow environment. As detailed above, the environmental data may be in the form of, for example and without limitation, temperature, humidity, air quality, light intensity, carbon dioxide levels, oxygen levels and other ambient conditions. The environmental data may also include data relating to the irrigation system and the fluids contained therein. For example, the environmental data may include, without limitation, fluid level, conductivity, fluid temperature, nutrient concentration, and pressure. The environmental data from the sensors may be received, stored and analyzed by a control unit. The control unit may be in wired or wireless communication with the environmental sensors.

As shown in step 1312, the method 1300 may include determining if the environmental conditions of the grow environment are in appropriate ranges for an ideal plant growth. The control unit may be programmed with preset ranges of allowable environmental conditions. Upon the receipt of the environmental data from the sensors, the control unit may analyze the data and determine if the environmental conditions are within the preset ranges.

As shown in step 1314, if the environmental data received from one or more of the sensors indicates an out-of-range condition, the control unit may adjust the environmental controllers to remedy the condition and/or make a notification to a cultivator or technician. The control unit may be in communication with environmental controllers such as, without limitations, air conditioners/heaters, humidifier/dehumidifiers, fans, vents, lamps, pumps, water sources, nutrient dispensers, and oxygen tanks. The method 1300 may then receive updated environmental data from the sensors to determine if the out-of-range condition has been remedied.

The control unit may also or instead notify a cultivator or technician of an out of range condition or other maintenance need. Upon receipt of the notification, the cultivator or technician may determine that a grow tower, one of its plants, or other affixed equipment requires attention (i.e., a fault in the cultivation system or equipment that requires service or replacement, a plant requires trimming or replacement, or the like). According to aspects of the system and methods described herein, the cultivator or technician may visit the grown environment, locate the fault in the system equipment through an access aisle, slide the grow tower or light assembly from the grow aisle to the access aisle, and perform the necessary maintenance. The tower or light assembly may then be slid back to its original location, thereby clearing the access aisle. If the condition is remedied, or if the environmental conditions are all within appropriate ranges, the method may continue to monitor the conditions, as shown in step 1316.

FIG. 14 illustrates a computer system 1400. In general, the computer system 1400 may include a computing device 1410, such as a special-purpose computer designed and implemented for monitoring, controlling, and optimizing the cultivation of a plant or crop of plants. The computing device 1410 may be or include data sources, servers, client devices, and so forth. For example, the computing device 1410 may include a desktop computer workstation. The computing device 1410 may also or instead be any device suitable for interacting with other devices or sensors over a network 1402, such as a laptop computer, a desktop computer, a personal digital assistant, a tablet, a mobile phone, a television, a set top box, a wearable computer, and the like. The computing device 1410 may include a server such as any of the servers described above. In certain aspects, the computing device 1410 may be implemented using hardware or a combination of software and hardware. The computing device 1410 may be a standalone device, a device integrated into another entity or device, a platform distributed across multiple entities, or a virtualized device executing in a virtualization environment.

The network 1402 may include any data network(s) or internetwork(s) suitable for communicating data and control information among participants in the computer system 1400. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 1400. The network 1402 may also include a combination of data networks, and need not be limited to a strictly public or private network.

The external device 1404 may be any computer or other remote resource that connects to the computing device 1410 through the network 1402. This may include any of the servers or data sources described above.

In general, the computing device 1410 may include a processor 1412, a memory 1414, a network interface 1416, a data store 1418, and one or more input/output interfaces 1420. The computing device 1410 may further include or be in communication with peripherals 1422 and other external input/output devices that might connect to the input/output interfaces 1420.

The processor 1412 may be any processor or other processing circuitry capable of processing instructions for execution within the computing device 1410 or computer system 1400. The processor 1412 may include a singlethreaded processor, a multi-threaded processor, a multi-core processor and so forth. The processor 1412 may be capable of processing instructions stored in the memory 1414 or the data store 1418.

The memory 1414 may store information within the computing device 1410. The memory 1414 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 1414 may store program instructions, program data, executables, and other software and data useful for controlling operation of the computing device 1410 and configuring the computing device 1410 to perform functions for a user. The memory 1414 may include a number of different stages and types of memory for different aspects of operation of the computing device 1410. For example, a processor may include on-board memory and/or cache for faster access to certain data or instructions, and a separate, main memory or the like may be included to expand memory capacity as desired. All such memory types may be a part of the memory 1414 as contemplated herein.

The memory 1414 may, in general, include a non-volatile computer readable medium containing computer code that, when executed by the computing device 1410 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 1414 is depicted, it will be understood that any number of memories may be usefully incorporated into the computing device 1410. For example, a first memory may provide non-volatile storage such as a disk drive for permanent or long-term storage of files and code even when the computing device 1410 is powered down. A second memory such as a random access memory may provide volatile (but higher speed) memory for storing instructions and data for executing processes. A third memory may be used to improve performance by providing higher speed memory physically adjacent to the processor 1412 for registers, caching and so forth.

The network interface 1416 may include any hardware and/or software for connecting the computing device 1410 in a communicating relationship with other resources through the network 1402. This may include remote resources accessible through the Internet, as well as local resources available using short range communications protocols using, e.g., physical connections (e.g., Ethernet), radio frequency communications (e.g., Wi-Fi), optical communications, (e.g., fiber optics, infrared, or the like), ultrasonic communications, or any combination of these or other media that might be used to carry data between the computing device 1410 and other devices. The network interface 1416 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 1416 may include any combination of hardware and software suitable for coupling the components of the computing device 1410 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 1402 such as the Internet. This may also or instead include hardware/software for a WiMax connection or a cellular network connection (using, e.g., CDMA, GSM, LTE, or any other suitable protocol or combination of protocols). The network interface 1416 may be included as part of the input/output devices 1420 or vice-versa.

The data store 1418 may be any internal memory store providing a computer-readable medium such as a disk drive, an optical drive, a magnetic drive, a flash drive, or other device capable of providing mass storage for the computing device 1410. The data store 1418 may store computer readable instructions, data structures, program modules, and other data for the computing device 1410 or computer system 1400 in a non-volatile form for relatively long-term, persistent storage and subsequent retrieval and use. For example, the data store 1418 may store an operating system, application programs, program data, databases, files, and other program modules or other software objects and the like.

The input/output interface 1420 may support input from and output to other devices that might couple to the computing device 1410. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for wirelessly coupling in a communicating relationship with other local devices. It will be understood that, while the network interface 1416 for network communications is described separately from the input/output interface 1420 for local device communications, these two interfaces may be the same, or may share functionality, such as where a USB port is used to attach to a Wi-Fi accessory, or where an Ethernet connection is used to couple to a local network attached storage.

A peripheral 1422 may include any device used to provide information to or receive information from the computing device 1400. This may include human input/output (I/O) devices such as a keyboard, a mouse, a mouse pad, a track ball, a joystick, a microphone, a foot pedal, a camera, a touch screen, a scanner, or other device that might be employed by the user 1430 to provide input to the computing device 1410. This may also or instead include a display, a speaker, a printer, a projector, a headset or any other audiovisual device for presenting information to a user. The peripheral 1422 may also or instead include a digital signal processing device, an actuator, or other device to support control of or communication with other devices or components. Other I/O devices suitable for use as a peripheral 1422 include haptic devices, three-dimensional rendering systems, augmented-reality displays, and so forth. In one aspect, the peripheral 1422 may serve as the network interface 1416, such as with a USB device configured to provide communications via short range (e.g., Bluetooth, Wi-Fi, Infrared, RF, or the like) or long range (e.g., cellular data or WiMax) communications protocols. In another aspect, the peripheral 1422 may augment operation of the computing device 1410 with additional functions or features, such as a global positioning system (GPS) device, a security dongle, or any other device. In another aspect, the peripheral 1422 may include a storage device such as a flash card, USB drive, or other solid-state device, or an optical drive, a magnetic drive, a disk drive, or other device or combination of devices suitable for bulk storage. More generally, any device or combination of devices suitable for use with the computing device 1400 may be used as a peripheral 1422 as contemplated herein.

Other hardware 1426 may be incorporated into the computing device 1400 such as a co-processor, a digital signal processing system, a math co-processor, a graphics engine, a video driver, a camera, a microphone, speakers, and so forth. The other hardware 1426 may also or instead include expanded input/output ports, extra memory, additional drives (e.g., a DVD drive or other accessory), and so forth.

A bus 1432 or combination of busses may serve as an electromechanical backbone for interconnecting components of the computing device 1400 such as the processor 1412, memory 1414, network interface 1416, other hardware 1426, data store 1418, and input/output interface. As shown in the figure, each of the components of the computing device 1410 may be interconnected using a system bus 1432 in a communicating relationship for sharing controls, commands, data, power, and so forth.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system comprising:
    a frame having an interior width and length;
    a track extending the interior length of the frame, a plurality of scaffolds slidably attached to the track, each scaffold comprising:
        a beam extending across a width of the scaffold;
        a scaffold track affixed to the beam;
        at least two mounts slidably attached to the scaffold track, the mounts sized and positioned to define a first aisle, a second aisle and an access aisle therebetween, wherein, for each scaffold, one of a first mount and a second mount of the at least two mounts is laterally slidable to the access aisle at a time;
    at least two hydroponic towers fixably attached to each mount, each hydroponic tower comprising a plurality of vessels arranged vertically along a column;
    at least one lamp directed towards the vessels of the columns; and
    an irrigation system in fluid communication with the hydroponic towers.

2. The system of claim 1 wherein the scaffold track is substantially perpendicular to the length of the frame.

3. The system of claim 1 wherein the track comprises a first and second rail extending the length of the frame, the scaffold slidably attached to the first and second rails.

4. The system of claim 3 wherein the rails are affixed to opposing sides of the frame.

5. The system of claim 1 further comprising a locking mechanism for each of the plurality of scaffolds, wherein engagement of the locking mechanism prevents movement of the scaffold along the track.

6. The system of claim 1 wherein the frame comprises a shipping container.

7. The system of claim 1 wherein the frame comprises an intermodal freight container.

8. The system of claim 1 wherein the frame comprises a semi-truck trailer.

9. The system of claim 1 wherein the frame comprises an enclosed indoor space.

10. The system of claim 1 further comprising a control system.

11. The system of claim 10 wherein the control system comprises a sensor for at least one of temperature, humidity, carbon dioxide, oxygen, pH, conductivity, reservoir level and light.

12. The system of claim 10 wherein the control unit comprises:
    at least one thermometer;
    at least one air circulator;
    a humidity control device;
    a lamp controller;
    a carbon dioxide controller;
    an air heating/cooling system;
    a pump in fluid communication with an irrigation system; and
    a processor configured to monitor and control the control unit to establish and maintain preset environmental conditions.

* * * * *